United States Patent [19]

Kay

[11] Patent Number: 4,724,032
[45] Date of Patent: Feb. 9, 1988

[54] SHEET SEPARATING MACHINE AND METHOD

[76] Inventor: Thomas Kay, 119 E. Berkley Dr., Arlington Heights, Ill. 60004

[21] Appl. No.: 793,464

[22] Filed: Oct. 29, 1985

Related U.S. Application Data

[63] Continuation-in-part of Ser. No. 782,999, Oct. 2, 1985, abandoned.

[51] Int. Cl.$^4$ .............................................. B32B 31/16
[52] U.S. Cl. ................................... 156/344; 156/584; 271/97; 271/280
[58] Field of Search ................ 156/344, 584; 264/556, 264/335; 271/97, 98, 280

[56] References Cited

U.S. PATENT DOCUMENTS

| | | | |
|---|---|---|---|
| 3,794,546 | 2/1974 | Cohen et al. | 156/344 |
| 4,183,751 | 1/1980 | Matsumoto et al. | 156/344 X |
| 4,273,606 | 6/1981 | Trilli | 156/344 X |
| 4,466,852 | 8/1984 | Beltz et al. | 156/344 |
| 4,508,589 | 4/1985 | Tarui et al. | 156/584 |
| 4,526,634 | 7/1985 | Beer | 156/344 X |

*Primary Examiner*—Robert A. Dawson
*Attorney, Agent, or Firm*—Laff, Whitesel, Conte & Saret

[57] ABSTRACT

A sheet separating machine automatically separates and removes a sheet of a dry nonextendable film from a printed circuit panel. The machine comprises a plurality of feeding rollers carrying the panel with the films attached to either or both sides thereof through the machine. The stop lever interrupts a movement of the panel at a predetermined location for a selected time interval. An edge separator for loosening a film edge during the interval rides along the film edge and separates the film edge from the panel by utilizing pressure wheels and turbulent air flow. Knife means breaking a bondage between the panel and the film force the film to completely separate from the underlying panel. The separated film is conveyed by the guide means toward a film accumulator.

77 Claims, 15 Drawing Figures

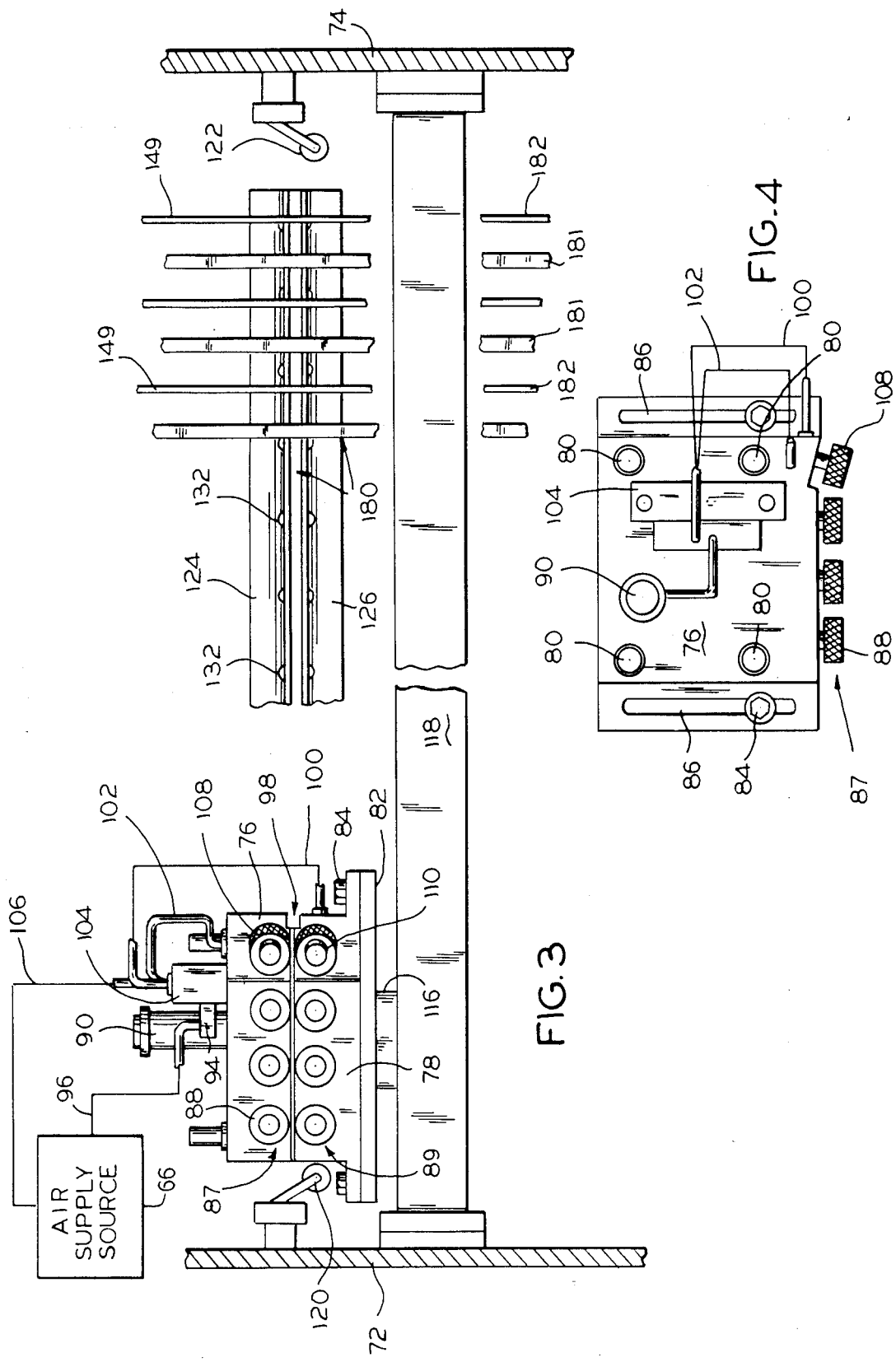

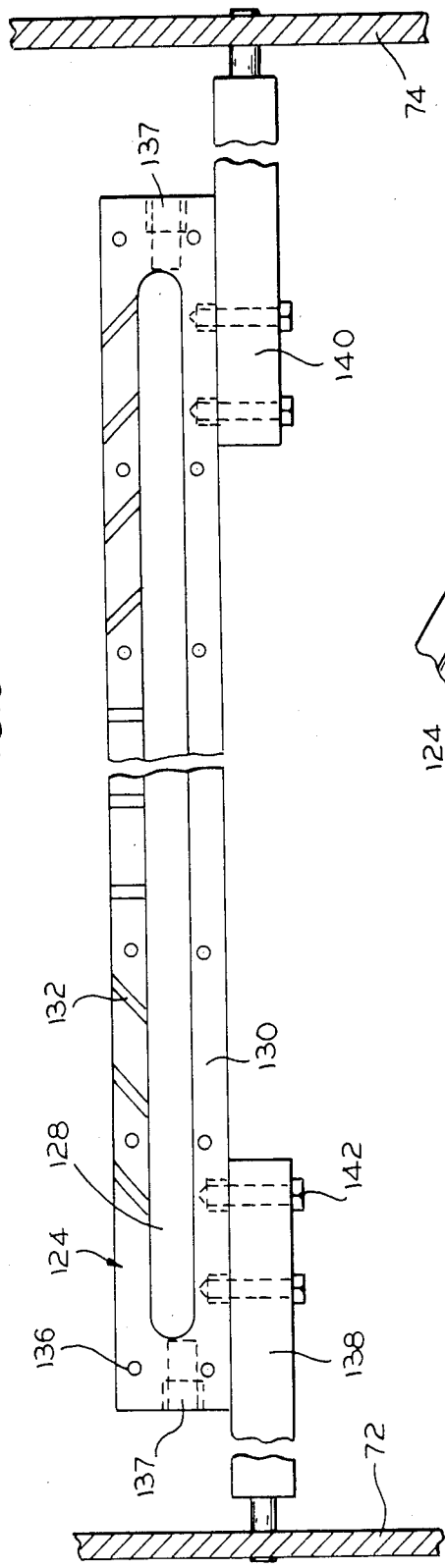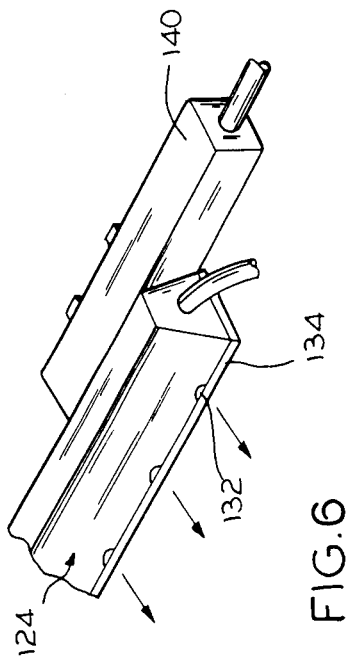

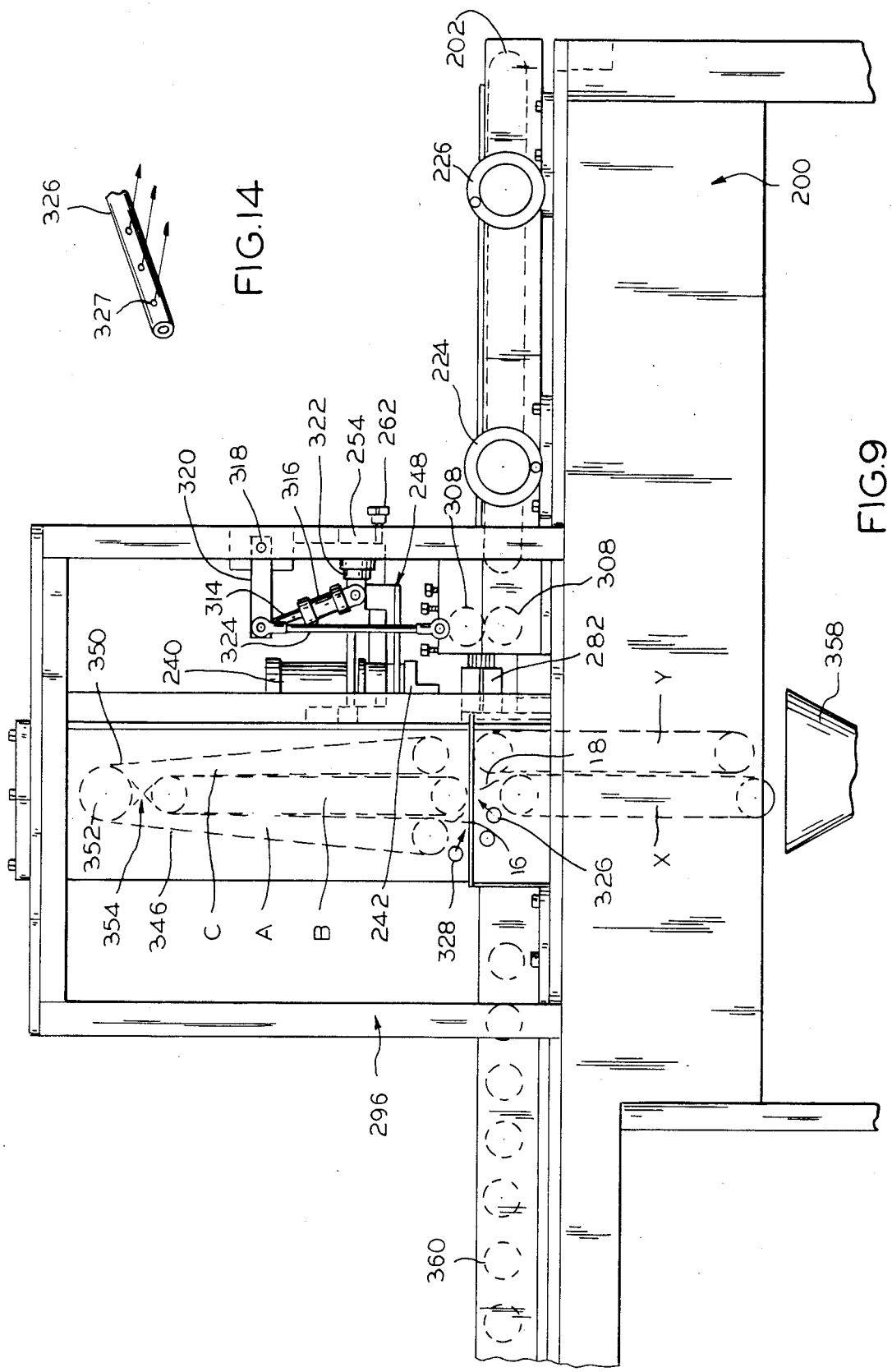

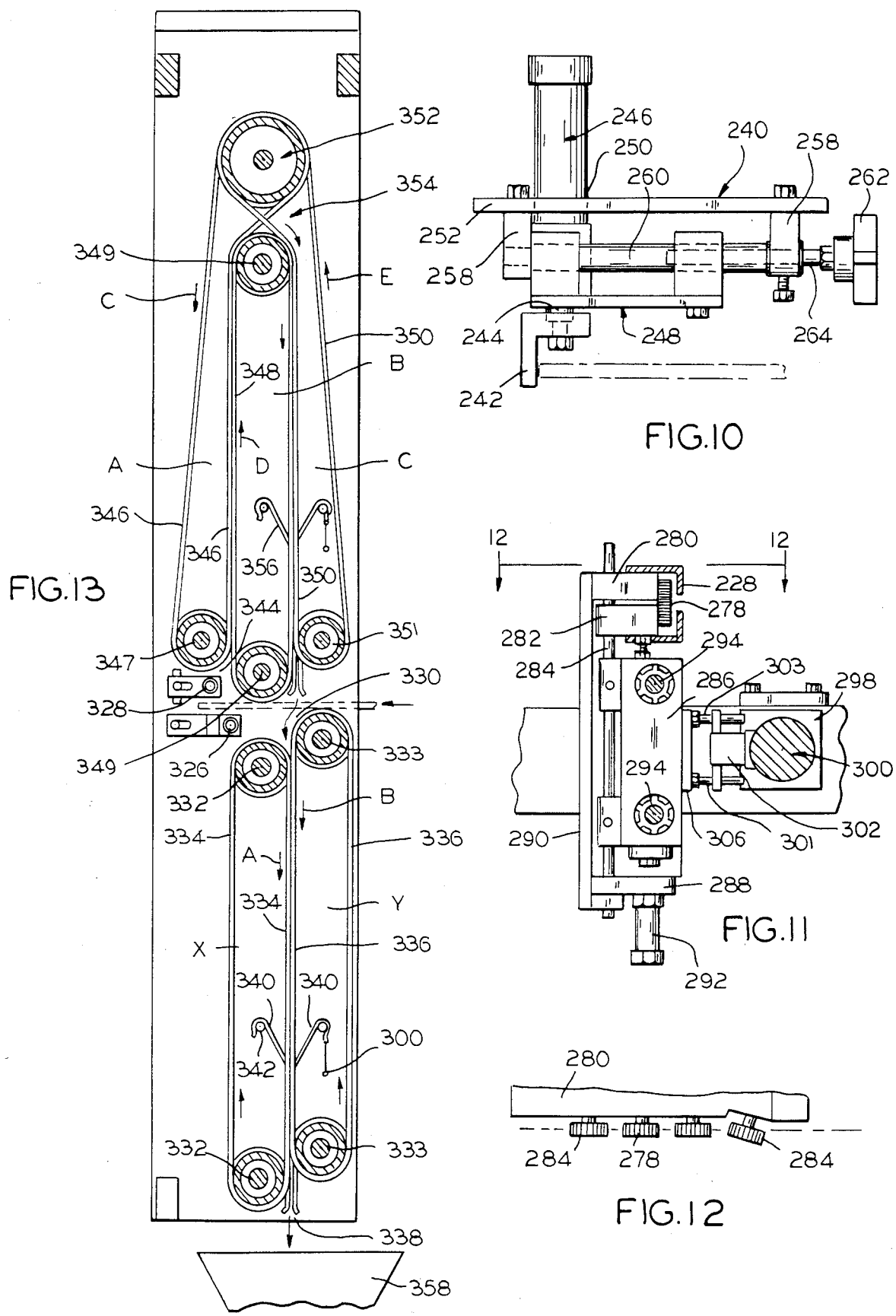

SHEET SEPARATING MACHINE AND METHOD

This is a continuation-in-part of application Ser. No. 782,999, filed Oct. 2, 1985 and now abandoned.

BACKGROUND OF THE INVENTION

1. Field of the Invention

This invention pertains to sheet separating machines and methods and more particularly to machines and methods for stripping protective dry films from the underlying solid panel used for printed circuit boards.

2. Information Disclosure Statement

The printed circuit panels are usually covered by one or two protective coatings which are used during the dry film processing. The conventional coating is usually made of Mylar or polyester. As a final step of the film processing the chemically treated panel surface is developed by exposure to light or chemicals in accordance with a predetermined pattern of the circuit. The protective film or films must be removed from the underlying panel before such exposure or treatment. Such panels are usually made out of copper, being covered on either or both sides by a photosensitive material which reacts to light or chemicals when exposed thereto. Conventional machines use consumable materials, such as tape, to strip these protective coatings.

The machine and method which is the subject of the present invention avoids the use of such consumable materials. Each protective film is automatically stripped from the underlining panel by loosening a leading edge of the film with pressure wheels and air turbulence, and subsequently stripping the film off the panel by air knives. The protective films attached to both sides of the panel can be simultaneously removed and transported to a disposal receptacle at a predetermined location.

The subject invention is described in greater detail hereinbelow.

SUMMARY OF THE INVENTION

The subject invention provides for a sheet stripping machine which automatically separates and removes sheets of film adhering to a solid panel. The machine comprises feeder means carrying the panel through the stripping machine, and stop means interrupting movement of the panel at a predetermined location for a selected time interval. An edge separator means loosens the edge of each sheet during the interval and air knife means break the bondage between the panel and the sheets. Guide means convey and direct the separated sheets into a sheet accumulator.

DESCRIPTION OF THE DRAWINGS

FIG. 3 is a front view thereof with break away segments which is taken substantially along the lines 3—3 of FIG. 1;

FIG. 4 is a detail top view of an edge separator device thereof;

FIG. 5 is a bottom view of an air knife forming part of the present invention without a cover plate;

FIG. 6 is a fragmentary perspective view of the air knife of FIG. 5;

FIG. 9 is a semi-schematic view of the machine of FIG. 8;

FIG. 10 is a fragmentary view of an additional embodiment of a stop mechanism;

FIG. 11 is a partially cross-sectional fragmentary view of a film edge separating mechanism in another embodiment;

FIG. 12 is a fragmentary top view of the mechanism of FIG. 11 taken substantially along the lines 12—12 in FIG. 11;

FIG. 13 is a partially cross-sectional and schematic side view of the guide belt system of the additional embodiment;

FIG. 14 is a perspective view of an air knife fragment; and

DESCRIPTION OF THE PREFERRED EMBODIMENT

The invention may be carried into practice in a number of ways, but one specific embodiment will be described by way of an example only.

Figure 1:
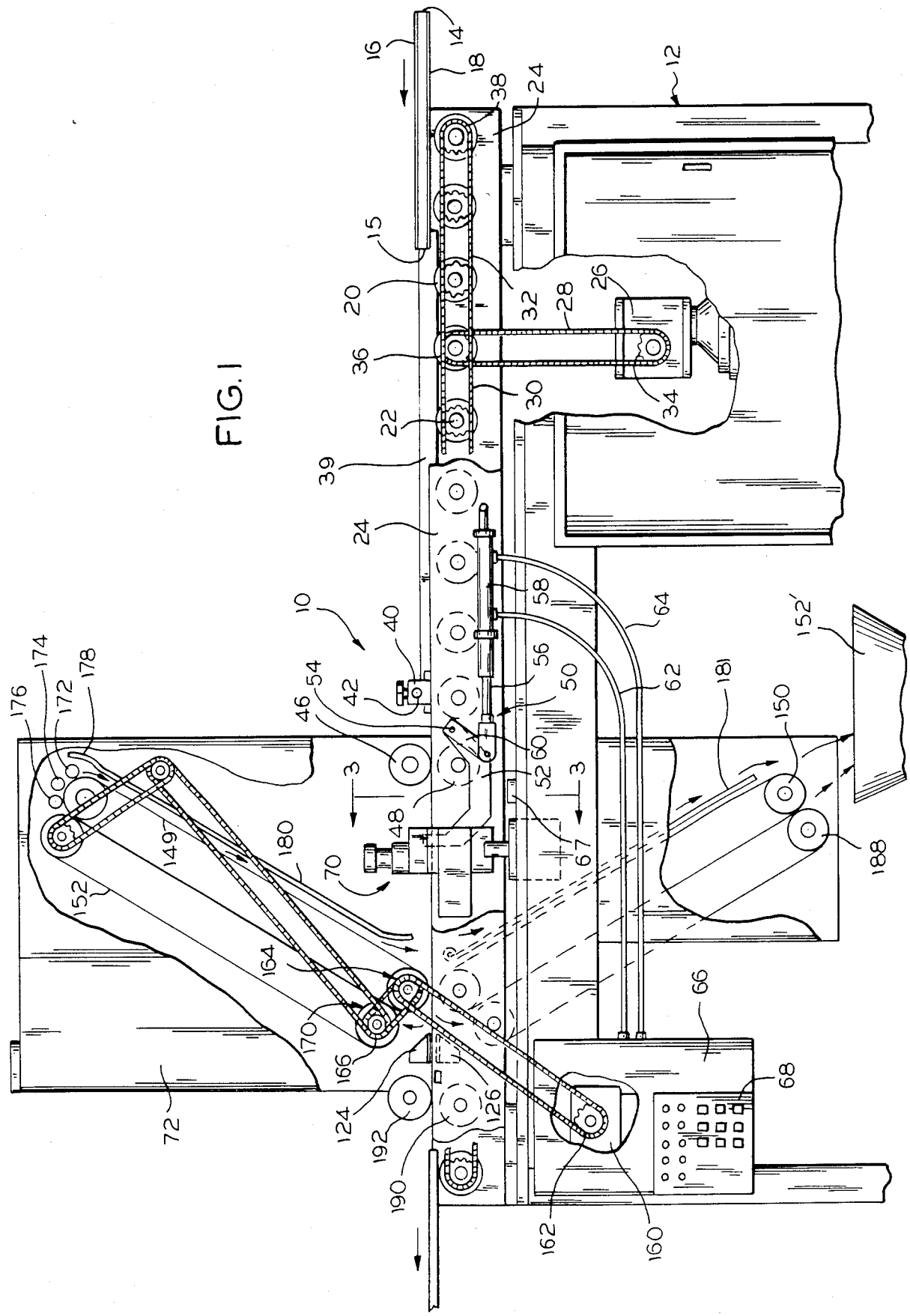
FIG. 1 is a partially cross-sectional view of one side of a machine constructed in accordance with a preferred embodiment of the subject invention.

Referring now to the drawings wherein reference characters designate like or corresponding parts throughout the several views, there is shown in FIG. 1 a sheet stripping machine 10 supported by a frame 12. A copper plate or panel 14 covered by a photosensitive chemical composition layer, on either one or both sides thereof is shown on the left side of FIG. 1 as it enters stripping machine 10 to be processed as described hereinbelow. The panel 14 has a leading edge 15 and is covered by dry nonextendable plastic sheets 16 and 18. The sheets 16 and 18 are heat bonded or otherwise secured to the panel's top and bottom sides, respectively. For illustration purposes, the leading edge 15 represents both the panel edge and the sheet edge. The stripping machine 10 can automatically strip one film or sheet attached to either side of the panel 14, or strip both simultaneously, as will be described.

Figure 7:
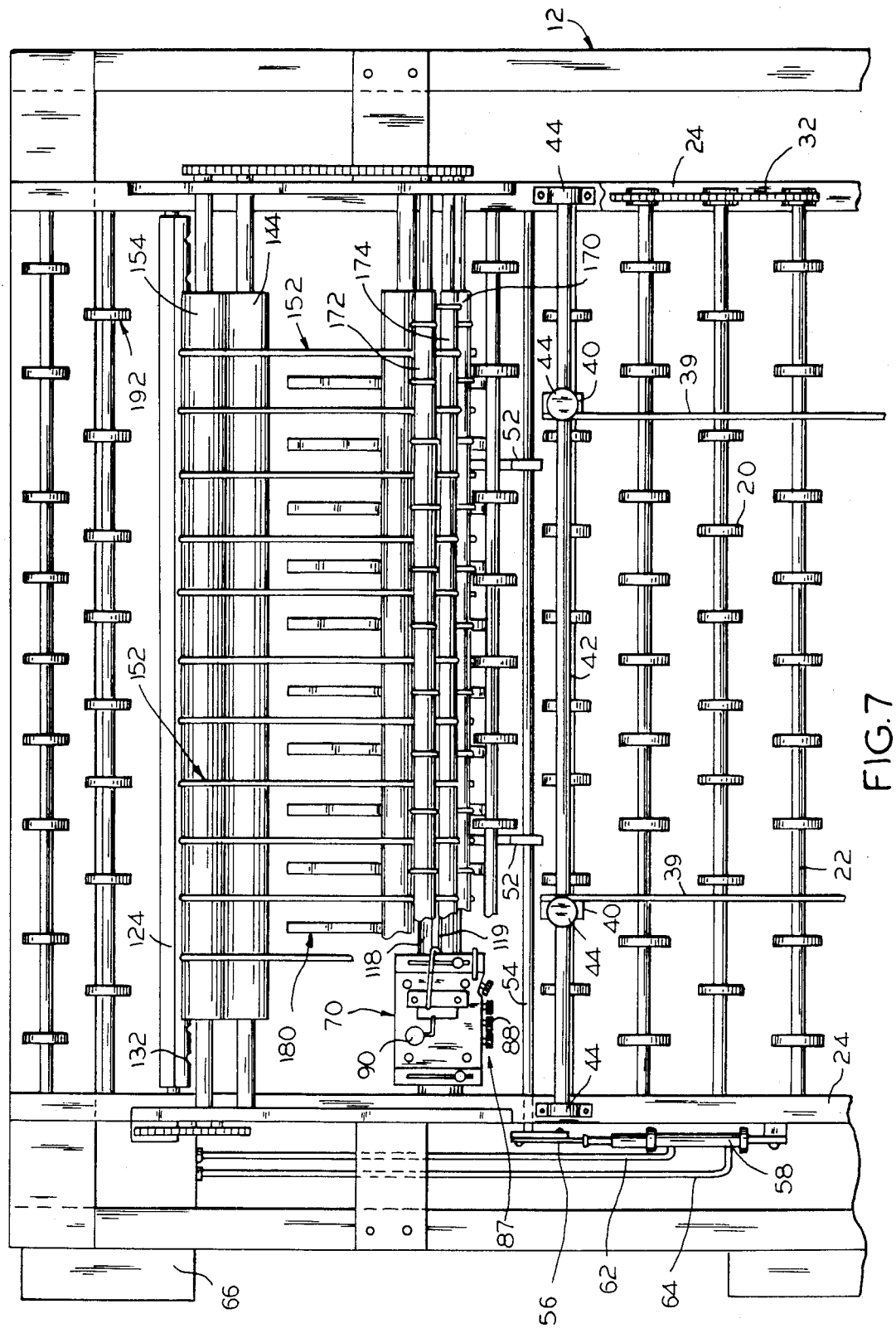
FIG. 7 is a top view of the machine of FIG. 1.

Stripper machine 10 includes a series of feeder rollers 20, which can be made of any resin based material, rotatably mounted on a plurality of parallel arbors 22. The arbors 22 are attached to the side walls 24 of the frame 12. The feeder rollers 20 are driven by a motor 26 via a series of chains 28, 30, and 32, and corresponding sprockets 34, 36, and 38, which in combination represent a drive linkage (partially shown in FIG. 1) for the feeder means. The rollers 20 carry the panel 14 between a pair of parallel vertical guides 39. The guide strips 39 can be made of metal, plastic or a similar light material. As shown in FIG. 7, the guide strips 39 are secured to a pair of yokes 40 which are slidingly mounted on a shaft 42. The shaft 42 is attached to the frame side walls 24 by the upstanding flanges 44. The yokes 40 can be adjustably secured in desired locations along the shaft 42 by the lock screws 44 protruding through the yokes 40. Such adjustment of the side guides 39 allows accommodation of panels 14 of varying widths.

The panel 14 traveling on top of the rollers 20 passes through a pair of rows of nip rollers 46 and 48 disposed one on top of another and being adjustably spring loaded to accommodate panels with varying thickness in the nip between the rollers. Such accommodation can be achieved by any biasing means urging one row of rollers to move toward another. The forward displacement of the panel 14 is blocked by a moving stop means 50 as the panel is advanced by rollers 46 and 48.

Stop means 50 comprises a pair of substantially L-shaped levers 52 pivotally mounted on a pivot rod 54 which is journalled in the frame side walls 24. The pivot rod 54 is secured to the piston rod 56 of the cylinder 58 via a toggle link 60. The toggle link 60 and the cylinder 58 are mounted outside the frame side wall 24. Pressure medium lines 62 and 64 connect the cylinder 58 with an external pressure medium supply source 66, such as an air compressor or a hydraulic pump.

An electric eye sensor 67 detects the presence of the leading edge of the panel as it abuts stop lever 52 and sends a signal to an electronic programmable controller 68 which controls and synchronizes the operation of all moving parts of the machine 10. Upon command of the controller 68, the cylinder 58 retracts its piston rod 56, and thereby rotates the pivot rod 54 and stop lever 52 in the direction shown by the arrow A of FIG. 2. The stop lever 52 turns downwardly and remains in the downward position, until the panel 14 moves to another processing station. As soon as stop lever 52 drops down, an edge separator 70 illustrated in FIGS. 2, 3, and 4 begins to travel from its initial position near the side retaining wall 72 to a temporary travel end position near the other side retaining wall 74 (FIG. 3) in a manner to be explained hereinbelow. If desired, additional stabilizing means can be utilized to restrain panel 14 against forward or rearward motion.

The edge separator 70 comprises an upper plate 76 mounted on a base plate 78, forming a carriage assembly. The upper plate reciprocally moves on a plurality of guide pins 80 protruding from the base plate 78. The base plate 78 is secured to support platform 82 by virtue of the retaining bolts 84. The elongated side slots 86 in the base plate 78 permit an adjustment of edge separator 70 since the base plate 78 can be secured to the platform 82 within the space defined by the slots 86.

A row 87 of pressure wheels 88 rotatably mounted to the upper plate 76 is vertically aligned with a row 89 of pressure wheels 88 rotatably mounted to the base plate 78. The wheel rows 87 and 89 synchronously contact the plastic film 16,18 adjacent the leading edge 15 of the panel 14. The film edge is adjacent the leading edge 15 of panel 14, or may be offset from the panel leading edge. The symmetrically opposed wheel rows 87 and 89 simultaneously roll along both sides of the panel 14 during the travel of edge separator 70 between the retaining walls 72 and 74. The position of wheel rows 87 and 89 relative to leading edges 15 of panel 14 may be adjusted by loosening bolts 84, sliding platform 82 along slots 86 until the proper position is reached, and then tightening bolts 84.

The upper plate 76 of edge separator 70 is adapted to be raised and lowered to accommodate varying thicknesses of the panel 14 by virtue of an air cylinder 90 (FIG. 3) mounted on upper plate 76. Air supply source 66 transmits air under pressure to cylinder 90 via plenum 94 and line 96. The piston rod (not shown) of cylinder 90 is rigidly attached to base plate 78. The air pressure applied to the lower surface of the piston forces the cylinder 90 to move down together with upper plate 76. The downward movement of upper plate 76 forces the upper plate wheel row 87 to squeeze leading edge 15 of panel 14 tightly against the lower wheel row 89. The pressure applied to panel 14 by wheel rows 87 and 89 is adjusted to prevent the pressure wheels from gouging or otherwise damaging the surface of panel 14.

The pressure wheels 88 and 89 have knurled surfaces in order to roughen up and loosen the film as the wheels travel along the leading edge, thereby breaking the bondage between the film and the panel. The rolling wheels 88 cause a shifting of the film edge relative to the panel. An air flow coming from the corner chamber 98 between plates 76 and 78 of edge separator 70 (FIG. 3) between the panel and the loosened film provides a turbulent air vortex augmenting the mechanical forces applied by the pressure wheels 88 in order to separate the panel and film edges. The corner chamber 98 is essentially a cut out block portion in the aligned corners of the upper and lower plates 76 and 78. The air to the corner chamber is provided via the air conduits 100 and 102 exiting from a chamber plenum 104. Plenum 104 is connected with air supply source 66 via conduit 106.

The right-hand or front pressure wheels 108 and 110, as viewed in FIGS. 3 and 4, are symmetrically mounted on the respective upper and base plates 76 and 78, at an angle, approximately within 3°-5°, relative to the line of the respective wheel rows 87 and 89. By mounting front wheels 108,110 at the aforesaid range of angles, it has been found that the efficiency of the initial separation of the leading edge of the film from the panel is substantially increased.

Figure 2:
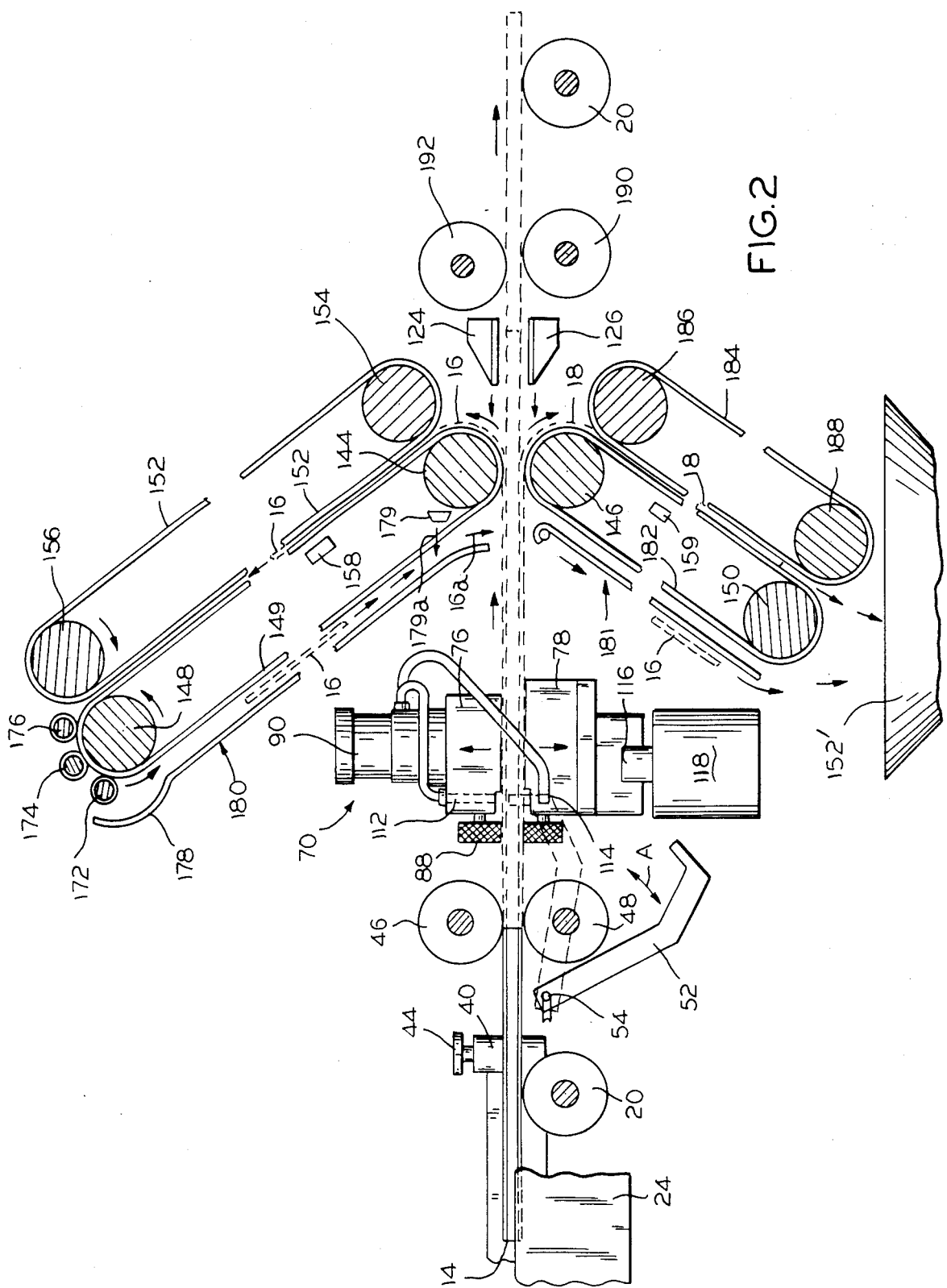
FIG. 2 is a fragmentary enlarged view of another side thereof.

Corner chamber 98 receives air from air channels 112 and 114 disposed internally of upper plate 76 an lower plate 78, respectively (FIG. 2). Channels 112 and 114 are connected with the lines 102 and 100, respectively. The edge separator 70 is supported by and reciprocally moved by a piston 116 of a double acting cylinder 118 having an elongated top slot 119, shown in FIG. 7, through which the cylinder piston 116 extends for connection with platform 82 of edge separator 70. The reciprocal movement of the edge separator 70 is terminated at the ends of air cylinder 118 when the platform 82 contacts one of the limit switches 120 and 122. The limit switches 120 and 122 are attached to the respective retaining walls 72 and 74.

When stop levers 52 drop down upon the advancement of a film-covered panel 14 to the stop levers, the controller 68 sends a signal to air supply souce 66 to actuate air cylinder 118. Piston 116 moves edge separator 70 towards the wall 74 (FIG. 3). The leading edge of the film separates from the panel under the force of pressure wheels 88 and the turbulent air flow emanating from the corner chamber 98 during the edge separator travel. When edge separator 70 contacts limit switch 122 mounted on wall 74, pressurized air is introduced into another end of cylinder 118 and piston 116 returns to its initial position near retaining wall 72, with the pressure wheels making a second pass over the film covered panel, thereby further separating the film from the panel.

After loosening the film edge, the panel 14 travels under the influence of nip rollers 46 and 48 towards the air knives 124 and 126 ejecting air jets toward the films 16 and 18 (FIG. 2). As best shown in FIGS. 5 and 6, the air knife assemblies 124 and 126 comprises an elongated chamber 128 having a flat bottom surface 130 which is notched with a plurality of grooves 132. The grooves 132 become air channels when the bottom panel 134 is attached to the bottom surface 130 by screws 136 or other suitable means.

Air is supplied to the air knife 124 through the container butt passages 137 which are connected to the air supply source 66. Brackets 138 and 140 attached to the air knive container 124 by bolts 142 are also secured to the retaining walls 72 and 74, respectively. The pattern of the air channels 132, being inclined toward the knife assembly center, and straight in the center section thereof, can be modified to suit different films. Additionally, the air knives 124, 126 are rotatably adjustable through a relatively small arc to maximize the efficiency of the air stripping step of the total stripping procedure.

When the panel 14 passes through the gap between two symmetrically opposed shafts 144 and 146 (FIG. 2), the air jets from the air knives 124 and 126 blow the previously loosened film edges away from the panel 14. The shafts 144 and 148 drive a series of belts or bands which form endless loops around these shafts. Analagously, shafts 146 and 150 drive loops of bands spaced apart along the length of these shafts. Each belt system is adapted to carry the separated films towards a film accumulator 152, as will be explained.

The film 16 blown away from the top side of the panel 14 toward the shaft 144 is forced to adhere to belts 149, which pulls the film such that the film is friction driven between a series of endless belts 149 encircling the shafts 144 and 148 and by other band loops 152 encircling shafts 154 and 156. The direction of rotation of these shafts is shown by the arrows adjacent the shafts in FIG. 2. Panel 14 continues to advance under the influence of nip rollers 46, 48. The pulling action of bands 149 and 152 augments the stripping action of air knife 124. The friction driven film 16 moves upwardly between the bands 149 and 152 until it's leading edge reaches the sensor 158. The programmable controller 68 receives a signal from the sensor 158 and responds with a speed acceleration of motor 160 connected to shafts 154 and 144 via a linkage 162, 164, and 170 including a series of chain loops and sprockets schematically shown in FIG. 1. Accordingly, the shafts 154 and 144 rotate faster after the leading edge of film is detected by sensor 158. At this point in the operation of the subject invention, the major portion of film 16 has been stripped from panel 14. The friction between belts 149 and 152 accommodates for any slippage caused by the variance in speed of belt movement and speed of film movement. After the speed of shafts 154 and 144 is increased, film 16 is more rapidly removed from panel 14 and deposited in film accumulator 152'.

The film 16 is driven to the top between the band loops 152 and 149, where the direction of its movement is reversed. The film is friction driven between the shaft 148 and three guiding shafts 172, 174, and 176. The film 16 makes a U-turn and continues to move downwardly within the curved portion 178 of upper guide strip grid 180 which extends between the walls 74 and 72. The forces of gravity and impetus provided by the return runs of belts 149 bearing against the guide strip grid 180 propel the film 16 along the upper surface of guide 180 until it reaches the lower end of the guide, as shown by the arrows 16A in FIG. 2.

An air manifold 179 (FIG. 2) is supported by retaining walls 72 and 74 and extends along the width of stripping machine 10 downstream of guide 180, as shown in FIG. 2. A stream of air, indicated by arrow 179A, eminates from manifold 179 and forces film 16 forward against the lower curved portion of guide 180. This prevents the leading edge of film 16 from curling back between belts 149 on roller 144 and belts 182 on roller 146.

At this point in the operation of stripping machine 10, panel 14 has passed from between rollers 144 and 146 under the influence of driven, spring loaded nip rollers 190,192 (FIG. 2) which engage advancing panel 14 and drive the panel forward as the films 16 and 18 are stripped from the panel by air knives 124,126. Rollers 20 then convey panel 14 to its next work processing station.

As stripped film 16 passes over the curved lower end of guide 180, it crosses the unoccupied path of panel 14 and falls by gravity onto the upper surface of guide strip grid 181 which extends downward at an angle and away from the machine components located beneath the panel of travel of panel 14. Grid 181 guides film 16 downward until the film falls off the lower end of the grid and into film accumulator 152'.

Analogously, the film 18 separated from the bottom side of panel 14 is blown by the air knife 126 towards the band loops 182 encircling the shafts 146 and 150, and the band loops 184 rotating about the shafts 186 and 188. The band loops 182 and 184 frictionally engage and drive the separated film 18 downward into the film accumulator 152'. The speed of shafts 146 and 186 is accelerated when the leading edge of film 18 reaches sensor 159 (FIG. 2), similar to the operation of shafts 144 and 154 responsive to sensor 158. This accelerates the deposit of the stripped film 18 into accumulator 152'.

As panel 14 continues to travel through the lower roller row 190 and upper roller row 192 toward the end of the machine, a sensor (not shown) is activated to halt the operation of stripper machine 10. Another panel 14 is deposited on the feeder rollers 20, brought to a halt by the stop lever 52, and the process of separating the sheet from the panel is repeated for this and each subsequent panel.

Another embodiment of the sheet stripping machine illustrated in FIGS. 8-15 includes four feed conveyors mounted on a frame 200 and carrying the panel 14 deposited on them. The feed conveyors include four endless belts 202, 204, 206, and 208, mounted on common shafts 210 and 212. The common shafts 210 and 212 drive pulleys 214 which in turn drive the belts 202-208. Splines of the common shafts permit sliding of both outer belts 202 and 208 and guide rails 216 and 218 interconnected therewith via a pair of sliding frames 220 and 222. Each sliding frame with its outer belt and guide rail is moved by rotation of a pair of handwheels 224, 226 and screw rods 228, which extend between the inner side frames 230 and 232. The inner side frame 230 contains sprockets and chains (not shown) linking the screw rods 228 for synchronous movement. Rotation of the screw rods 228, connected with the sliding frame by virtue of retaining nuts (not shown), forces the sliding frames 220 and 222 to move in the direction normal to the direction of the panel movement in order to accommodate panels with different widths. In addition to such manual adjustment of the distance between the two guide rails 216 and 218, rail air cylinders 234 and 236 attached to each sliding frame facilitate automatic centering of the panel. Piston rods 238 of the rail air cylinders 234 and 236, extended prior to the panel centering, are attached to corresponding sliding frames 220 and 222. Retraction of the piston rods 238, according to a signal from the controller, causes movement of the guide rails 216, 218 toward each other. Thus, the guide rails 216, 218 squeeze the side edges of the panel for proper positioning thereof.

A stop mechanism 240, shown in greater detail in FIG. 10, temporarily blocks linear displacement of the panel by an angle-shaped lever 242 attached to a piston rod 244 of a stop air cylinder 246. The cylinder 246 mounted on a carriage 248 moves within an opening 250 in a platform 252 which is secured to a pair of horizontal frame bars 254, 256 via two side plates 258, as better shown in FIG. 8. Each side plate 258 supports the ends of two guide rods 260. Rotation of a knob 262 at one end of an adjustment screw bar 264 causes forward and backward movement of the carriage 248 which is threadably engaged with the adjustment screw bar 264. Thus, rotation of knob 262 allows manual control of the location of the edge of the board 14 in relation to the knurling wheels 278.

The carriage 248 moves the cylinder 246 along the guide rods 260, and within the platform opening 250. Such adjustment of the cylinder position along the longitudinal center plane of the machine, or the plane normal thereto, can be achieved by other suitable means. Vertical travel of the stop lever 242 for temporary stopping of the panel is triggered by a sensor 266 (shown in FIG. 8) mounted on the machine transverse frame (not shown) along the path of the panel. The sensor 266 also triggers a series of sequential processes regulated by the programmable controller.

When the panel stops moving forward due to the blocking action of the stop lever 242, clamp bars 268 move toward each other under the force of piston rods of the clamp air cylinders 270, located on opposite ends of the clamp bars 268. T-shaped clamp bars 268 reciprocally move in opposite directions for temporary retention of the panel. Each clamp cylinder 270 is secured to the machine side frame via mount plates 274, shown in FIG. 8, which are welded to the butts of the clamp bars 268. The clamp bars 268 compress both sides of the panel by their wide flanges 276 and retain the panel in a fixed position during the sheet edge separating operation.

Sheet edge separation by breaking the bondage between the sheets 16, 18 and the panel 14 by knurled wheels is described hereinabove. In the embodiment illustrated in FIGS. 8 and 11, the knurled wheels 278 in the upper block 280 and the lower block 282 include outer wheels 284 which are angled relative to the other wheels. In other words, each outer wheel 284, as shown in FIG. 12, in each row of wheels is angled about 5 degrees off the wheel row line. Angled outer wheels 284 help to reinforce and complete detachment of the sheet edge from the panel 14 when the wheels 278, 284 roll in opposite directions.

As shown in FIG. 11, the upper block 280 slides on a pair of vertical guide rods 284 extending through the lower block 282 and support block 286. The lower end of the guide rods 284 projects through and guides movement of the mount platform 288 which is interconnected with the upper block 280 via a mount plate 290. The mount platform 288 supports a compression cylinder 292, the mount plate 290 and upper block 280 all of which travel on the guide rods 284. The compression cylinder 292 forces the upper block 280 to move up and down by means of mount plate 290. The upper block wheels put pressure on the edge of a sheet of a mylar film or other non-extendable dry plastic film covering panel 14 without damaging the photoemulsion or photosensitive film underneath the sheet.

Figure 8:
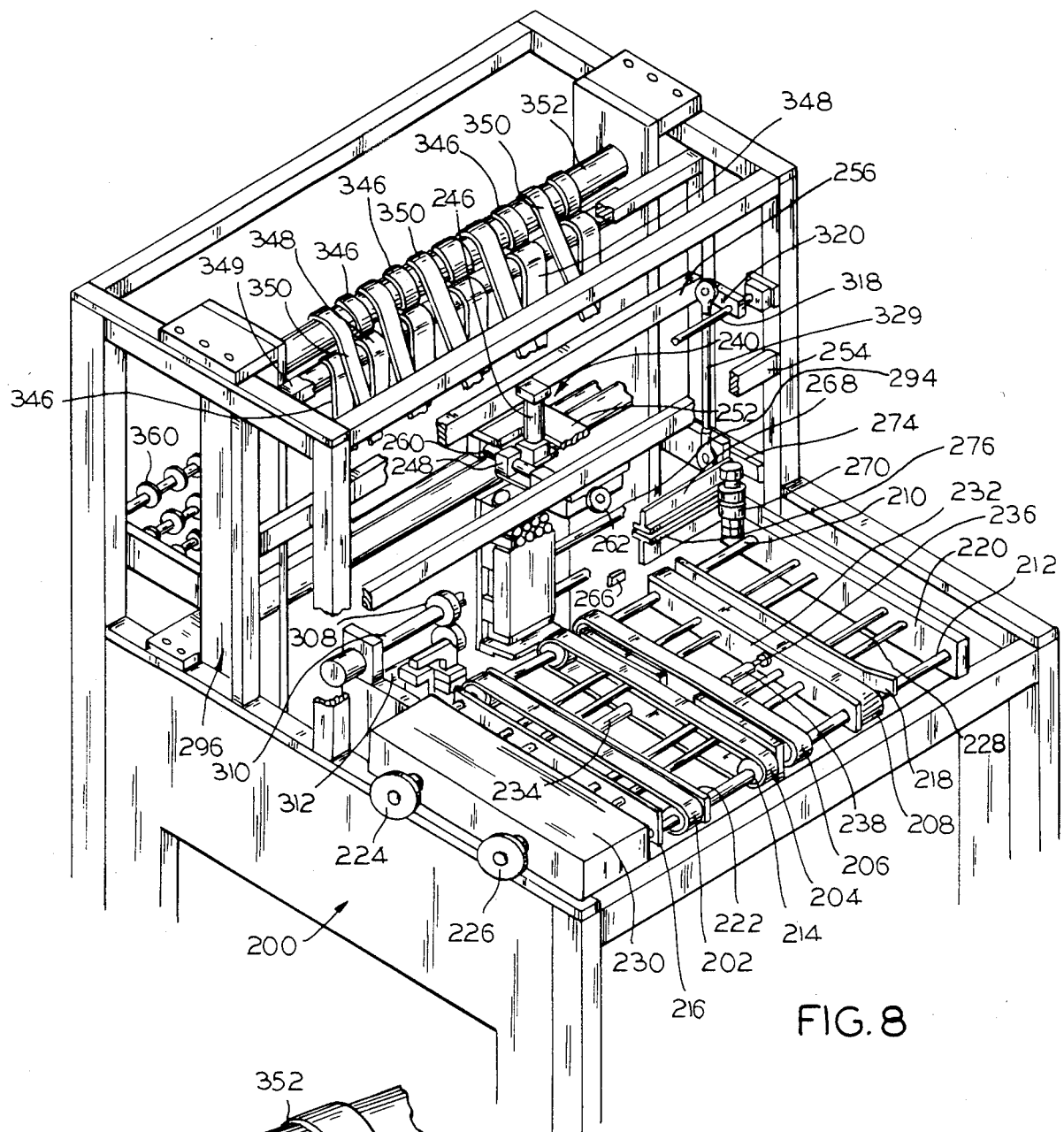
FIG. 8 is a perspective view of the machine in another embodiment.
Figure 15:
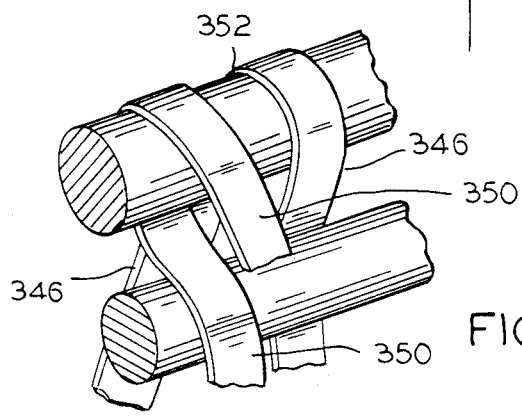
FIG. 15 is a perspective view of the top guide belt fragment of the additional embodiment.

The support block 286 for knurled wheels 278, 284 reciprocally moves on two parallel support shafts 294 secured to the side frame 296 (FIG. 8). Movement of the support block 286 carrying the upper and lower blocks 280, 282, and the compression cylinder 292 is caused by a propulsion cylinder 298. The piston rod 300 of the propulsion cylinder, coupled with the support block 286 through the pin 302, lugs 303 and support block plate 306, forces the entire edge separation mechanism mounted on block 286 to move between the upstanding side frames 296 and, thus, roll the knurled wheels 278 along the sheet edge of panel 14.

The embodiment of the invention disclosed in FIGS. 8-15 is adapted to make one or more passes over the film sheet edge as the knurled wheels 278, 284 create air pockets beneath the leading edge of film 16 and its supporting panel 14. It has been found that in some instances the film sheet 16 is thicker than average, and more than one pass of the knurled wheels over the sheet edge may be necessary to adequately separate the film leading edge from the panel. Accomodation for various thicknesses of film sheet can also be made by varying the pressure between the knurling wheels mounted on block 280 and those mounted on block 282 through compression cylinder 292.

The ability of the present invention to vary the pressure between the upper and lower lines of knurled wheels 278, 284 is important for two additional reasons. First, excessive pressure may have to be reduced to prevent unwarranted damage to the photoemulsion layer on top of panel 14, which is being protected by film sheet 16. Second, various thicknesses of panels 14 can be accomodated in the stripping machine 10 by varying the pressure between the upper and lower line of knurled wheels.

Further, the embodiment of FIGS. 8-15 provides a structure which reduces the structural load on the propulsion cylinder 298 by supporting a major portion of the weight of block 286, blocks 280 and 282, and all of the elements attached thereto, on support shafts 294 rather than directly upon piston rod 300 of the propulsion cylinder.

Nip rollers 308, shown in FIGS. 8 and 9, mounted on two rotatably driven parallel shafts 310, 312 propel the panel 14 forward after the sheet edge separation process is completed. The upper shaft 310 moves up and down under the force of the nip roller cylinders 316 (FIG. 9) mounted to a brace spanning the distance between the side frames 296. A piston rod 314 of each cylinder 316 is pivotally connected to another frame brace 318 via a pivot lever 320, which is slightly longer then the console 322 connecting the cylinder to the frame brace on bar 254. Thus, the cylinders 316 at each end of the shaft 310 are inclined relative to the frame brace. Movement of the piston rods 314 forces the travel of the pivot links 324, which are pivotally secured to the upper nip roller shaft 310. This permits adjustment or modulation of pressure applied by the nip rollers 308, made of polyurethane or the like material, on the panel 14.

After the sheet edge separation by knurled wheels 278, 284, the panel is propelled by the rotation of nip rollers 308 toward the air knives 326 and 328 (FIGS. 9, 13). The air knives or air manifolds comprise hollow conduits perforated by a plurality of openings 327, as shown in FIG. 14, and extend across the path of the panel's travel. The air knives eject streams of air at an angle relative to the panel, and strip the sheets off the panel by forcing air initially into the pockets along the leading edge of the film 16 which were previously formed by knurling wheels 278, 284. The air from knives 326, 328 then continues to strip the film 16, 18 from the advancing panel 14. The bottom air knife 326 breaks the bondage between the sheet 18 and the bottom side of the panel 14, and is located closer to the edge separating mechanism than the top air knife 328 which blows the sheet 16 off the top side of the panel 14. This staggered relation between the air knives is determined by the subsequent path of the removed films 16, 18, as is explained hereinbelow.

As best illustrated in FIG. 13, the bottom air knife 326 blows an edge of the lower sheet 18 toward the space or path 330 between juxtaposed endless loops "X" and "Y" of a series of parallel belts driven by two pairs of rotating shafts 332 and 333, respectively. The belts 334 and 336 are driven in the direction illustrated by the arrows "A" and "B" in FIG. 13. Loops "X" and "Y" of staggered belts 334 and 336, respectively, adjoin or grip corresponding sides of the sheet 18 and drive the sheet toward the end 338 of the path 330. At the end 338 of the path 330, the sheet passes between an array of wire guides 340 located in the same planes as adjoining belts 334 and 336 of opposing loops "X" and "Y". The wire guides 340 contact the sheet for removal of the static electricity therefrom by absorbing it through the connecting bar 342 welded to the frame 200 as schematically shown in FIG. 13. Wire guides 340 perform the dual function of assisting to guide the sheet 18 to path end 338.

As panel 14 advances, a detached edge of the sheet 16 covering the top side of panel 14 is blown by top air knife 328 into the space 344 between adjacent loops A, B, and C of a series of parallel belts forming a path for the sheet. As seen in FIG. 13, space 344 is slightly downstream from space 330. Therefore, top air knife 328 is in a staggered relationship relative to the vertical plane passing through lower air knife 326. This causes the stripper 10 to begin the removal of bottom sheet 18 from panel 14 slightly ahead of the removal of sheet 16 from panel 14. The belts 346 and 348 of respective loops A and B, rotate in opposite directions (see arrows C and D of FIG. 13) and drag or drive the sheet 16 to the top of the loop "B". A pair of shafts 349 rotate the belts 348 of the loop "B". The staggered belts 346, rotated at one end by a shaft 347, and staggered belts 350, rotated at one end by a shaft 351, of the respective loops "A" and "C" have a common shaft 352 at the opposite end thereof, thus creating an alternating "intersection" 354 of belts moving in diverging directions. The direction of movement of belt 350 is indicated by the arrows "E" in FIG. 13. The sheet 16 drawn in an upward direction to intersection 354 between the belts 346 and 348 encounters and is captured by the belts 350 of loops "C", which force sheet 16 to move into the path between the loops "B" and "C" downward by belts 348 and 350. At the end of this path the wire guides 356, analogous to previously described wire guides 340 remove the static electricity from sheet 16 for facile separation of the sheet from the rubber-faced belts, and also assist in guiding the sheet 16 downward.

The sheet ejected from the above mentioned path between belts 348 and 350 drops into the path 330 between the loops "X" and "Y". This path is common for sheets 16 and 18 removed from both top and bottom sides of the panel. As top sheet 16 enters path 330, lower sheet 18 has already passed between end 338 of path 330. The path between the belts 348 and 350 and the path 330 are located substantially in one plane, but the system will work with paths being angled relative to each other as long as the sheet 16 is ultimately directed into the path 330. A sheet accumulator 358 located underneath the exit end of the film path collects all sheets or films 16 and 18 at one location.

The panel 14, striped off of the sheets, continues to travel by virtue of exit rollers 360, best shown in FIG. 9, conveying the panel toward the end of the machine.

In the preferred embodiments of the disclosed invention, detectors may be disposed adjacent the paths of sheets 16 and 18 as they travel between belts 346 and 348, and belts 334 and 336, respectively, to sense the presence or absence of a film sheet. If no film sheet is sensed, this is an obvious indication that one or both of the film sheets remains adhered to the panel 14. Under such conditions, the programable controller 68 functions to stop the operation of the machine and, if desired, to flash or sound a warning signal. The programable controller 68 synchronizing the sequence of operation of all moving elements is described above.

The subject machine offers a number of advantages in processing and preparation of printed circuit boards. One of the main advantages is the speed and accuracy of the separation process. Also, the possibility of mishandling and damaging the delicate surface of the chemically treated panel is greatly diminished. The automatic separation of the film from the panel eliminates the need for consumables such as tapes or other adhesive means and saves the time needed for manual labor involved in that process. The machine is intended primarily for the separation of the dry and nonextendable mylar or polyester films from the printed circuit board made from a copper panel. It is quite apparent, that the machine can be used for any sheet separation process involving a solid panel and a dry nonextendable coating or film which is heat bonded or otherwise attached thereto. Further, the disclosed apparatus and process can be used to strip film from either one or two surfaces of a panel.

While one embodiment of the invention has been illustrated and described herein, various changes and modifications may be made therein without departing from the spirit of the invention as defined by the scope of the appended claims.

What is claimed is:

1. A protective sheet stripper for automatic separation and removal of the sheet adhering to a panel and comprising:
   feeder means carrying said panel through the stripper;
   stop means interrupting movement of said panel at a predetermined location for a selected time interval;
   edge separator means for loosening a sheet edge from said panel during said interval;
   knife means for breaking the bondage between said panel and said sheet;
   transport means for directing the separated sheet into a film accumulator.

2. The stripper of claim 1, wherein said feeder means comprise a plurality of rollers mounted on rods extending transversely to a line of movement of said panel.

3. The stripper of claim 1, wherein said stop means comprise a moveable stop temporarily blocking said panel displacement during loosening of said sheet edge from said panel.

4. The stripper of claim 1, and synchronization means for controlling the sequence of panel movement, and the operation of said stop means, knife means and transport means.

5. The stripper of claim 1, wherein said edge separator comprises pressure wheels adapted to simultaneously engage and loosen a leading edge of sheets attached to opposite sides of said panel.

6. The stripper of claim 1, wherein said knife means comprise an air container with opening means for providing an air jet pointed towards a separation line between said panel and said sheet.

7. The stripper of claim 1, wherein said transport means include a plurality of bands for conveying the films separated from either side of said panel to said film accumulator.

8. The stripper of claim 7, wherein said transport means further includes rigid guide means for conveying said separated films from said bands to said film accumulator.

9. A film stripper for automatic separation of a panel and film means covering said panel, said stripper comprising:
a plurality of rollers carrying said panel through a film separation process;
stop means blocking linear movement of said panel for a selected time period;
an edge separator, moveable along an edge of said film means and applying multi-angled forces thereto for loosening the adherence of said edge to said panel;
air knivse blowing a stream of air toward a separation line between said panel and said film means to separate said film means from said panel;
transport means for guiding said film means separated from either side of said panel into a film means accumulator.

10. The stripper of claim 9, wherein said stop means comprise a substantially L-shaped lever pivotally mounted on a stripper frame.

11. The stripper of claim 10, wherein said lever is pivotally linked to and actuated by an air cylinder to move between a first position blocking movement of said panel to a second position permitting movement of said panel.

12. The stripper of claim 9, said separator comprising a carriage assembly moveable across the path of linear movement of said panel by an air cylinder, said carriage assembly having pressure wheels displacing an edge of said film means on either side of said panel;
said carriage assembly including air channels providing an air flow for elevation of said edge of said film means away from said panel.

13. The stripper of claim 9, wherein said transport means include a series of rollers reversing the direction of the moving film means.

14. The stripper of claim 12, wherein said pressure wheels include at least one wheel being angled relative to other wheels.

15. The stripper of claim 9, wherein said transport means include a series of bands to remove and carry said film means with variable speed from said panel and to a film accumulator.

16. The stripper of claim 12, said carriage assembly comprising an upper base plate, a lower base plate slidably connected to said upper base plate, and a support platform movably attached to said lower base plate;
said support platform connected to a piston actuated in reciprocal lateral directions by said air cylinder;
said pressure wheels disposed in corresponding rows on said upper base plate and said lower base plate whereby a nip is formed between said upper and lower base plate rows of pressure wheels to simultaneously engage the upper and lower surfaces of said panel between said rows of pressure rollers as said edge separator moves along an edge of said film means.

17. The stripper of claim 12, wherein said pressure wheels comprise knurled surfaces.

18. The stripper of claim 16, wherein said slidable connection between said upper base plate and said lower base plate includes a second air cylinder mounted on said upper base plate, a second piston attached to said lower base plate and extending through an aperture in said upper base plate and into said second cylinder, said piston and second air cylinder being connected to a source of air pressure whereby air pressure applied to a surface of said piston forces said upper base plate towards engagement with said lower base plate to capture said panel and said film between said corresponding rows of pressure wheels at a predetermined pressure.

19. The stripper of claim 18, including means to vary the amount of air pressure applied to said second piston to adjust the amount of pressure applied to said panel and said edge of said film means to prevent damage to the surface of said panel.

20. The stripper of claim 15, wherein said transport means further includes means to drive said series of bands at a first speed to remove said film means from said panel, and at a second speed to continue to remove and to carry said film means to a film accumulator, sensor means mounted on said film stripper for detecting a predetermined location of the leading edge of said film means after said leading edge and a portion of said film means has been removed from said panel and said film means is moving along said transport means, said sensor means also operatively connected to said drive means whereby said drive means are actuated by a controller actuated by said sensor to accelerate the movement of said film means along said guide means when the leading edge of said film means is detected by said sensor means.

21. The stripper of claim 12, said carriage assembly comprising an upper base plate, a lower base plate slidably connected to said upper base plate, and a support platform fixed to said lower base plate;
said air channels being disposed in said upper base plate and said lower base plate, respectively, each said channel having an exit port adjacent a corner chamber formed by said upper and lower base plates whereby air flowing from said exit ports into said corner chamber as said carriage assembly moves across the path of linear movement of said panel creates a turbulent air vortex between said panel and an elevated edge of said film means to augment said multi-angled forces applied to said film means by said pressure wheels when said leading edge of said film means is elevated from said panel.

22. The stripper of claim 16, wherein said moveable attachment between said lower base plate and said support platform is adapted to provide adjustment of the position of said pressure rollers in a direction parallel to the direction of linear movement of said panel to compensate for varying distances between the edge of said panel and the leading edge of said film means.

23. The stripper of claim 15, wherein said transport means further includes means to drive said series of bands at a first speed to remove said film means from said panel, and at a second high speed to continue to remove and to carry said film means from said panel and to a film accumulator, said removal of said film means from said panel by said transport means operating at said second higher speed adds to the separating action of said air knives.

24. The stripper of claim 13, wherein said series of reversing rollers comprises a plurality of roller elements disposed above said transport means in the path of travel of said film means separated from the upper surface of said panel, whereby said film means contact said roller elements as said film means is advanced along an advancing run of said series of bands, and said roller elements direct the movement of said film means into engagement with, and for transportation by, the return run of said series of bands.

25. The stripper of claim 15, wherein said transport means further include guide means attached to said stripper, said guide means adapted to receive said film means after separation of said film means from the upper surface of said panel and after said film means is transported away from said panel, whereby said guide means directs said film means away from said seriees of bands and to said film accumulator.

26. the stripper of claim 25, wherein said transport means further includes air deflector means disposed adjacent the path of travel of said film means along said return run of said series of bands, said air deflector means producing a jet of air directed at the leading edge of said film means to direct said leading edge of said film means away from said series of bands and toward said guide means to prevent said leading edge of said film means from curling into said series of bands.

27. A protective film stripper for automatically removing a dry plastic film from an underlying panel and comprising:
   a series of feeding rollers carrying said panels through strippers means;
   a moveable stop means blocking displacement of said panel for a predetermined time interval;
   an edge separator for detaching a leading film edge from either side of said panel;
   said edge separator including a series of pressure wheels being self-adjustable to capture varying panel thicknesses and moveable along said film edge;
   said separator further including air channels providing an air flow cooperating with said pressure wheels for detaching said film edge from said panel;
   air knife means for directing a jet of air along a separation line between said film and said panel to lift said film off either side of said panel; and
   transport means for carrying said separated film towards a film accumulator.

28. The stripper of claim 17, wherein said stop means comprise an L-shaped lever pivotally mounted on said stripper.

29. The stripper of claim 27, wherein said separator comprises an upper base plate reciprocably movable relative to a lower base plate being mounted on a support platform;
   said plates having said pressure wheels rotatably mounted thereto;
   said support platform riding along an air cylinder and reciprocally actuated thereby.

30. The stripper of claim 27, wherein said transport means directs said panel and said film to predetermined locations; whereby said transport means move films separated from opposite sides of said panel in opposite directions.

31. The stripper of claim 27, wherein said air knife means comprise a hollow tube with slots for ejecting air therethrough toward said separation line.

32. The stripper of claim 31, wherein said slots each have a longitudinal axis and said air knife means include a forward lateral edge, the longitudinal axes of said slots in said air knife means being disposed at an angle to the forward lateral edge of said air knife means whereby the air ejected from said air knife means impacts said separation line at an angle to said separation line.

33. The stripper of claim 27, and control means for synchronizing movement of said panel and said film with the operation of the remaining mechanical movements of said stripper;
   said control means including sensors to detect the position of said panel and the leading edge of said film, and a programmable controller.

34. The stripper of claim 27, wherein said transport means include a series of parallel bands running an endless loop about a plurality of shafts;
   said bands forcing said film to move with an acclerated speed as said film reaches certain locations.

35. A method of stripping a sheet of non-extendable material adhering to a panel comprising the steps of:
   (a) advancing said panel with said sheet adhered thereto to a first station adjacent an edge separating means;
   (b) stopping said panel;
   (c) loosening the leading edge of said sheet from said panel by applying said edge separating means to said leading edge of said sheet;
   (d) advancing said panel and said sheet beyond said first station;
   (e) directing a moving current of air between said loosened leading edge of said sheet and said panel to further separate said sheet from said panel; and
   (f) transporting said loosened sheet into a sheet accumulator.

36. The method of claim 35, wherein said step of loosening the leading edge of said sheet from said panel includes the step of advancing knurled roller means along the leading edge of said sheet, whereby said knurled roller means bend said leading edge of said sheet to form spaces between said leading edge of said sheet and said panel.

37. The method of claim 36 wherein the step of loosening the leading edge of said sheet from said panel further includes the step of driving air into said spaces to create air turbulence between said sheet and said panel, which air turbulence enhances the step of loosening said sheet from said panel.

38. The method of claim 35 wherein the step of directing a moving current of air between said loosened leading edge of said sheet and said panel includes passing said panel and said sheet with said loosened leading edge adjacent air knife means extending laterally along the length of said leading edge, said air knife means providing an air jet directed at the separation line between said panel and said sheet.

39. The method of claim 35 wherein said step of transporting said loosened sheet into a sheet accumulator includes the further steps of engaging said loosened sheet of film by a plurality of roller mounted bands, and conveying said sheet between said roller mounted bands and adjacent guide means to said accumulator means.

40. The method of claim 39 including the further step of accelerating the speed of said roller mounted bands after said sheet has been engaged by said bands to assist in separating said sheet from said panel.

41. The method of claim 36 whereby knurled roller means apply multi-angled forces to said leading edge of said sheet during the step of loosening said leading edge of said sheet from said panel.

42. A sheet stripping machine for separation of at least one sheet attached to to a panel, said machine comprising:
feed means for conveying said panel;
guide means for adjustable centering of said panel on said feed means;
stop means for intermittent blocking of panel displacement;
clamp means for retaining said panel in a fixed position for a selected period of time;
edge separating means for detaching an edge of said sheet from said panel;
knife means for stripping said sheet off said panel;
sheet guiding means for directing the sheet removed from any side of said panel toward a sheet accumulator.

43. The machine of claim 42, and propelling means for moving said panel toward said knife means.

44. The machine of claim 42, wherein said feed means include adjustable guide rails and conveyors which position and move panels having a wide variety of widths.

45. The machine of claim 42, wherein said stop means include an adjustable stop lever reciprocally moving above the panel transversely to the direction of the panel displacement.

46. The machine of claim 42, wherein said clamp means include a pair of bars symmetrically opposing each other and synchronously compressing said panel for temporary retention of said panel.

47. The machine of claim 42, wherein said edge separating means include knurled wheel means rising along the edge of said sheet; and said wheel means comprise outer wheel elements being angled relative to other wheel elements.

48. The machine of claim 42, wherein said knife means comprise air manifolds ejecting air toward said edge of said sheet under an angle relative to said panel.

49. The machine of claim 42, wherein said sheet guiding means comprise a series of belts engaging both sides of the sheet separated from the panel.

50. A sheet separating machine for removal of sheets attached to top and bottom sides of a panel, said machine comprising:
feed conveyors initiating movement of the panel;
guide rails adjustably positioning the panel on said feed conveyors;
a stop lever preventing movement of the panel for a selected period of time;
sheet stripping means for removing said sheets from said panel;
guide belt means for directing sheets detached from both sides of the panel via a series of belts.

51. The machine of claim 50, wherein said guide belt means comprise a plurality of belts moving the sheets removed from the top side of the panel and the bottom side of the panel in opposite directions.

52. The machine of claim 50, wherein said guide belt means move the sheet removed from the top side of the panel through the same plane as the sheet removed from the bottom side thereof.

53. The machine of claim 50, wherein said sheet stripping means comprises edge separating means and knife means for air injection between said panel and said sheets.

54. The machine of claim 50, wherein said guide belt means comprise a series of staggered endless belts extending around at least one common shaft for bringing a sheet removed from one side of the panel toward said common shaft and then reversing the direction of the sheet displacement.

55. A sheet stripping machine for removal of films attached to at least one side of a panel, said machine comprising:
feed conveyors moving a panel and guide rails automatically positioning the panel on the feed conveyors;
an adjustable stop temporarily blocking displacement of the panel;
edge separating means for detaching a film edge from said panel;
knife means stripping the film from the panel;
film guide means moving the film removed from the panel to accumulator means.

56. The machine of claim 55, and propelling means for moving said panel after said edge separating means detaches a film edge from said panel.

57. The machine of claim 55, and exit means for conveying the panel after removal of the film.

58. The machine of claim 55, wherein said guide means comprises:
a series of endless belts sequentially pulling said film removed from one side of the panel in a first direction and then in an opposite second direction.

59. The machine of claim 56, wherein said propelling means comprise nip rollers mounted for rotation on parallel shafts, one of said shafts mounted to said machine for reciprocally moving said one shaft in opposite directions for temporary compressing and driving the panel toward said knife means.

60. The machine of claim 55, and contact guides removing static electricity from said film as said film passes between said guides;
said guides located at an end of said film guide means.

61. The machine of claim 55, and clamp bars compressing the panel for temporary retention thereof during operation of said edge separating means.

62. The machine of claim 55, wherein said edge separating means comprise two blocks each carrying knurled wheels;
one of said blocks adapted to move relative to another;
drive means connected to said blocks to reciprocally drive the blocks; and support bars adapted to guide and partially bear the weight of said blocks.

63. A film stripper for automatic separation of a panel and film means covering said panel, said stripper comprising:
a transport means carrying said panel through a film separation process;
stop means blocking linear movement of said panel for a selected time period;
edge separator means applying forces to an edge of said film means during said selected time period for loosening the adherence of said edge to said panel;

air knives blowing a stream of air toward a separation line between said panel and said film means to separate said film means from said panel;

said transport means including additional means for guiding said film means separated from either side of said panel into a film means accumulator.

64. The film stripper of claim 63 wherein said air knives separate said film means from said panel as said panel resumes linear movement.

65. The film stripper of claim 9, said edge separator means comprising a carriage assembly moveable across the path of linear movement of said panel by an air cylinder, said carriage assembly having pressure wheels displacing an edge of said film means on either side of said panel.

66. The film stripper of claim 65, said carriage assembly comprising an upper base plate, a lower base plate slidably connected to said upper base plate, and a support platform fixed to said lower base plate.

67. A protective film stripper for automatically removing a dry plastic film from an underlining panel and comprising:
- a series of feeding rollers carrying said panels through stripper means;
- a moveable stop means blocking displacement of said panel for a predetermined time interval;
- an edge separator for detaching a leading film edge from either side of said panel;
- said edge separator including a series of pressure wheels being self-adjustable to capture varying panel thicknesses and moveable along said film edge;
- air knife means for directing a jet of air along a separation line between said film and said panel to lift said film off either side of said panel; and
- transport means for carrying said separated film towards a film accumulator.

68. The sheet stripping machine of claim 58 wherein said guide means includes a first moving belt system extending between a first shaft located adjacent said knife means whereby said first belt system is adapted to engage said film after said film has been stripped from said panel, and a second shaft located at a preselected distance from said first shaft;
- a second moving belt system extending between a third shaft located adjacent said first shaft and a fourth shaft located adjacent said second shaft;
- a third moving belt system extending between said fourth shaft and a fifth shaft located on the opposite side of said first shaft relative to said third shaft;
- said second and third belt systems forming an offset intersection of belts moving in divergent directions adjacent said second shaft;
- said film being captured by said intersection after said film is conveyed in said first direction to said intersection by said first and second moving belt systems, the direction of said film being substantially reversed upon contact in said intersection with said third belt system, and said film being conveyed in said second direction by said first and third belt systems.

69. The stripper machine of claim 68 wherein one run of said first belt system and one run of said second belt system move in the same direction and are in substantial contact with each other to form a path for conveying said film in said first direction to said intersection.

70. The stripper machine of claim 68 wherein one run of said first belt system and one run of said third belt system move in the same direction and are in substantial contact with each other to form a path for conveying said film from said intersection in said second direction.

71. The stripping machine of claim 68 wherein each of said second and third belt systems comprise a plurality of belts, said plurality of belts arrayed in a staggered relation as they extend around said fourth shaft, whereby said intersection formed by said second and third belt systems adjacent said second shaft is an alternating intersection formed by said second and third belt systems.

72. The stripper of claim 5, wherein said edge separator means includes pressure wheel means riding along the edge of said sheet whereby air pockets are formed between said edge of said film and said panel to loosen said film edge from said panel.

73. The stripper of claim 1 wherein said edge separator means includes first aligned pressure roller means rotatably mounted on a first support means; second aligned pressure roller means rotatably mounted on a second support means, said first and second pressure roller means disposed adjacent each other to form a path between said first and second pressure roller means for passage of said panel and sheet; pressure regulator means disposed between said first and second support means to vary the pressure applied by said pressure rollers to said sheet and said panel.

74. The stripper of claim 73 wherein said pressure regulator means include additional means to vary the distance between said first pressure roller means and said second pressure roller means to accomodate various thicknesses of panels and sheets between said first and second pressure roller means.

75. The method of stripping a sheet of non-extendable material adhering to a panel according to claim 35 wherein the step of loosening the leading edge of said sheet from said panel includes driving said edge separating means across said leading edge of said sheet.

76. The machine of claim 55 wherein said film guide means comprise:
- a first series of endless belts sequentially pulling the film removed from one side of the panel in a first direction, and a second series of endless belts pulling the film removed from a second side of the panel in a second direction.

77. The machine of claim 55 wherein said edge separating means is adapted for reciprocal movement along an edge of the panel.

* * * * *